(12) United States Patent
Wada et al.

(10) Patent No.: US 12,145,576 B2
(45) Date of Patent: Nov. 19, 2024

(54) ELECTRICAL COMPONENT CONTROL DEVICE AND IN-VEHICLE ELECTRICAL COMPONENT DEVICE

(71) Applicant: DENSO CORPORATION, Kariya (JP)

(72) Inventors: Masatake Wada, Kariya (JP); Koudai Yamaura, Kariya (JP); Takamasa Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 153 days.

(21) Appl. No.: 18/147,873

(22) Filed: Dec. 29, 2022

(65) Prior Publication Data

US 2023/0142657 A1 May 11, 2023

Related U.S. Application Data

(63) Continuation of application No. PCT/JP2021/021209, filed on Jun. 3, 2021.

(30) Foreign Application Priority Data

Jul. 16, 2020 (JP) .................................. 2020-122103

(51) Int. Cl.
*B60W 30/06* (2006.01)
*B60H 1/00* (2006.01)
*B60W 60/00* (2020.01)

(52) U.S. Cl.
CPC ......... *B60W 30/06* (2013.01); *B60H 1/00771* (2013.01); *B60W 60/001* (2020.02); *B60W 2552/05* (2020.02); *B60W 2710/30* (2013.01)

(58) Field of Classification Search
CPC ............... B60W 30/06; B60W 60/001; B60W 2552/05; B60W 2710/30; B60H 1/00771
See application file for complete search history.

(56) References Cited

U.S. PATENT DOCUMENTS 11,572,982 B1 * 2/2023 Lerner .................... F17C 13/12
2007/0262574 A1 * 11/2007 Breed ............... B60R 21/01526
382/104

(Continued)

FOREIGN PATENT DOCUMENTS

JP 2009-168548 A 7/2009
JP 2018-505085 A 2/2018

(Continued)

*Primary Examiner* — Edwin A Young
(74) *Attorney, Agent, or Firm* — Harness, Dickey & Pierce, P.L.C.

(57) ABSTRACT

An electrical component control device controls an operation state of at least one electrical component mounted in an autonomous vehicle. The electrical component control device comprises a request determination unit that determines whether a movement request for moving the autonomous vehicle in a state where a user is not in the autonomous vehicle is received; an operation restraining unit that restrains operations of multiple target electrical components representing an electrical component that acts on five senses of the user when the autonomous vehicle is instructed to move in response to the movement request; an operation state recording unit that records operation states of the multiple target electrical components; and a state restoring unit that restores the operation states of the multiple target electrical components to the operation states of the multiple target electrical components recorded in the memory, before the user gets on the autonomous vehicle.

13 Claims, 9 Drawing Sheets

(56) References Cited

U.S. PATENT DOCUMENTS

| | | | |
|---|---|---|---|
| 2017/0190331 A1* | 7/2017 | Gupta | B60W 10/20 |
| 2017/0334380 A1 | 11/2017 | Bonnet et al. | |
| 2018/0118195 A1 | 5/2018 | Magarida et al. | |
| 2018/0270542 A1* | 9/2018 | Ramalingam | H04N 21/4858 |
| 2020/0148196 A1 | 5/2020 | Lim | |

FOREIGN PATENT DOCUMENTS

| | | |
|---|---|---|
| JP | 2018-070048 A | 5/2018 |
| JP | 2018-134888 A | 8/2018 |
| JP | 2020-080142 A | 5/2020 |

* cited by examiner

ELECTRICAL COMPONENT CONTROL DEVICE AND IN-VEHICLE ELECTRICAL COMPONENT DEVICE

CROSS REFERENCE TO RELATED APPLICATIONS

The present application is a continuation application of International Patent Application No. PCT/JP2021/021209 filed on Jun. 3, 2021, which designated the U.S. and claims the benefit of priority from Japanese Patent Application No. 2020-122103 filed on Jul. 16, 2020. The entire disclosures of all of the above applications are incorporated herein by reference.

TECHNICAL FIELD

The present disclosure relates to an electrical component control device configured to control operation states of electrical components in a vehicle.

BACKGROUND

There has been known a technology for closing a roof when a vehicle is loaded into a garage, a setting delay turn-off of light, and the like to activate an air conditioner, the light, and the like when the vehicle is unloaded from the garage.

SUMMARY

One aspect of the present disclosure provides an electrical component control device that controls an operation state of at least one electrical component mounted in an autonomous vehicle. The electrical component control device comprises a request determination unit, an operation restraining unit, an operation state recording unit, and a state restoring unit.

The request determination unit configured to determine whether a movement request for moving the autonomous vehicle without a user in the autonomous vehicle is received. The operation restraining unit is configured to restrain operations of a plurality of target electrical components that act on five senses of the user when the autonomous vehicle is instructed to move in response to the movement request. The operation state recording unit is configured to record, in a memory, operation states of the target electrical components at a timing the operation restraining unit restrains the operations of the target electrical components. The state restoring unit configured to, after the operation restraining unit restrained the operations of the multiple target electrical components, the target electrical components to the operation states recorded in the memory before the user gets on the autonomous vehicle.

DESCRIPTION OF EMBODIMENTS

Figure 1:
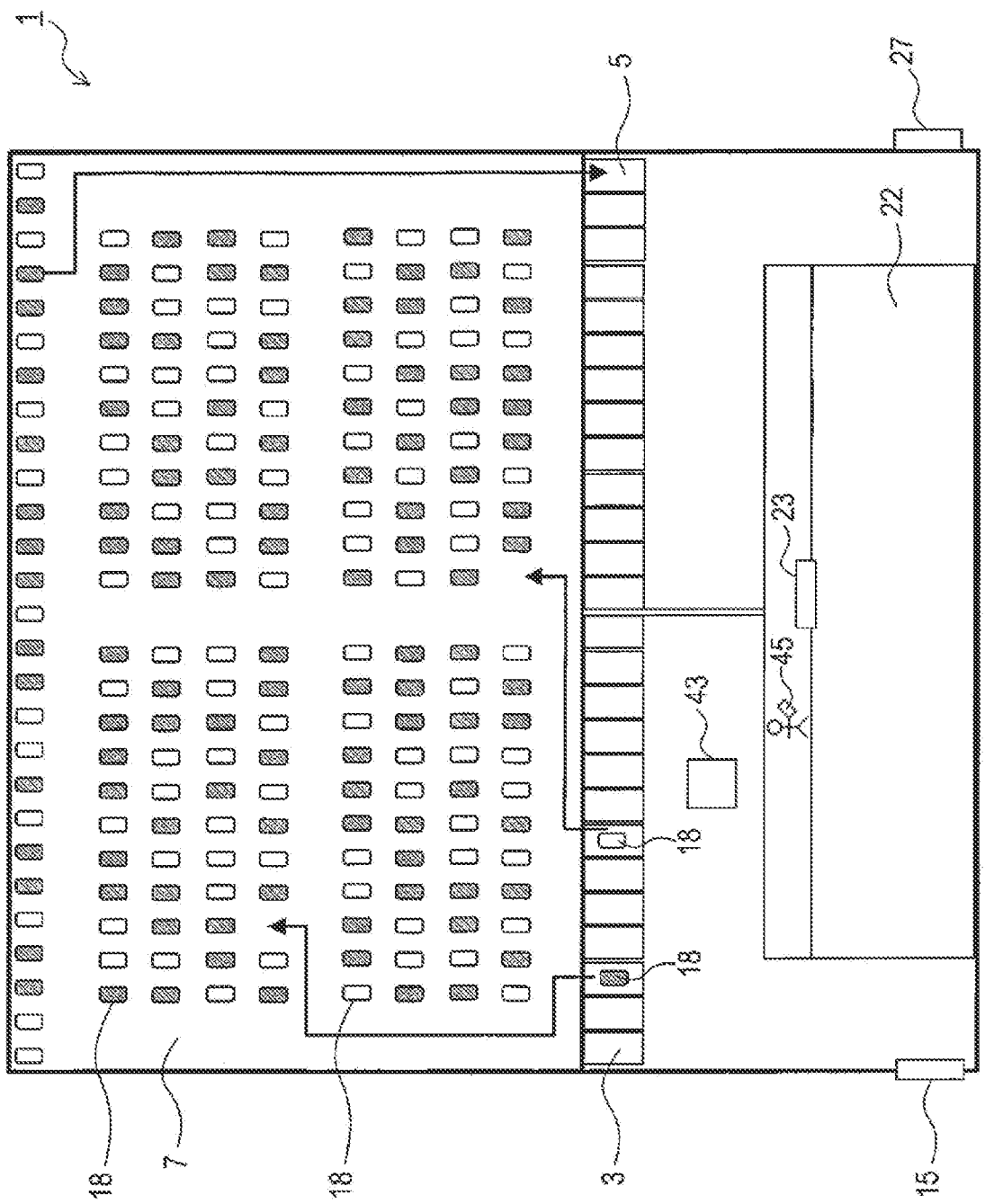
FIG. 1 is a top view showing an outline of a parking assistance system.

To begin with, a relevant technology will be described first only for understanding the following embodiments.

As a result of detailed studies by the inventors, a problem was found in the above-described technology that unnecessary energy is used in a state where a user is not in the vehicle when an autonomous vehicle moves in a parking lot without consideration for the vehicle moving in a state where the user is not in the vehicle.

According to one aspect of the present disclosure, an electrical component control device can reduce the unnecessary energy used when the autonomous vehicle moves in the parking lot.

A first aspect of the present disclosure is an electrical component control device that controls an operation of at least one electrical component mounted in an autonomous vehicle. The electrical component control device includes: a request determination unit configured to determine whether a movement request for moving the autonomous vehicle without a user in the autonomous vehicle is received; an operation restraining unit configured to restrain operations of a plurality of target electrical components that act on five senses of the user when the autonomous vehicle is instructed to move in response to the movement request; an operation state recording unit configured to record, in a memory, operation states of the target electrical components at a timing the operation restraining unit restrains the operations of the target electrical components; and a state restoring unit configured to, after the operation restraining unit restrained the operations of the target electrical components, restore the target electrical components to the operation states recorded in the memory before the user gets on the autonomous vehicle.

According to such a configuration, since an operation of the target electrical components is restrained when the autonomous vehicle travels without the user, it is possible to reduce a use of the unnecessary energy during the move of the autonomous vehicle.

A second aspect of the present disclosure is an in-vehicle electrical component control device that controls an operation state of at least one electrical component mounted in an autonomous vehicle. The in-vehicle electrical component control device includes: an operation restraining unit configured to restrain operations of a plurality of target electrical components that act on five senses of a user when the autonomous vehicle is instructed to move in response to a movement request for the autonomous vehicle to perform automatic valet parking to move between a getting on-off area and a parking area in a parking lot without the user in the autonomous vehicle; an operation state recording unit configured to record, in a memory, operation states of the target electrical components at a timing the operation restraining unit restrains the operations of the target electrical components; and a state restoring unit configured to, after the operation restraining unit restrained the operations of the target electrical components, restore the target electrical components to the operation states recorded in the memory before the user gets on the autonomous vehicle. The operation restraining unit is configured to, when the automatic valet parking is performed, switch the target electrical components to a restraining mode in which the operations of the target electrical components are restrained in a more restrictive manner than before the automatic valet parking is performed.

A third aspect of the present disclosure is an electrical component control device that controls an operation of at least one electrical component mounted in an autonomous vehicle. The electrical component control device includes: at least one processor programmed to: determine whether a movement request for moving the autonomous vehicle without a user in the autonomous vehicle is received; restrain operations of a plurality of target electrical components that act on five senses of the user when the autonomous vehicle is instructed to move in response to the movement request; record, in a memory, operation states of the target electrical components at a timing of restraining the operations of the target electrical components; and after restraining the operations of the target electrical components, restore the target electrical components to the operation states recorded in the memory before the user gets on the autonomous vehicle.

Hereinafter, embodiments of the present disclosure will be described with reference to the drawings.

1. Embodiments

[1-1. Configuration of Parking Assistance System 1]

A configuration of a parking assistance system 1 will be described with reference to FIGS. 1 to 3. As shown in FIG. 1, the parking assistance system 1 includes a vehicle entering chamber 3 set as a getting-off area, which is a region where a user gets off, a vehicle exiting chamber 5 set as a getting-on area, which is a region where the user gets on, and a parking area 7. Hereinafter, the region including the vehicle entering chamber 3, the vehicle exiting chamber 5, and the parking area 7 will also be referred to as a parking lot. The vehicle entering chamber 3 and the vehicle exiting chamber 5 are collectively referred to as a getting on-off area 3.5.

Multiple sections are provided in each of the vehicle entering chamber 3 and the vehicle exiting chamber 5. The vehicle entering chamber 3 is connected to an outside of the parking assistance system 1 via an inlet 15. An autonomous vehicle 18 can enter the vehicle entering chamber 3 from the outside through the inlet 15. The autonomous vehicle 18 has an automatic valet parking function.

The autonomous vehicle 18 only needs to be able to execute the automatic valet parking function in the parking lot, and does not need to have a function of performing autonomous driving outside the parking lot. The automatic valet parking function includes a function of traveling the vehicle from the vehicle entering chamber 3 to a parking position in the parking area 7 and parking the vehicle by autonomous driving, and a function of traveling the vehicle from the parking position in the parking area 7 to the vehicle exiting chamber 5. When the automatic valet parking function is implemented, the autonomous vehicle 18 moves between the getting on-off area 3.5 and the parking area 7 in the parking lot in a state where the user is not in the autonomous vehicle.

In particular, the automatic valet parking function includes a function of repeatedly acquiring position information of the autonomous vehicle 18 and transmitting the position information to a management device 39, and a function of receiving a guide route from the management device 39 and controlling and traveling the autonomous vehicle 18 along the guide route. The position information of the autonomous vehicle 18 indicates an estimation result of a current location of the autonomous vehicle 18, and includes, for example, a coordinate value within the region of the parking lot.

The vehicle entering chamber 3 and the vehicle exiting chamber 5 are adjacent to an entrance 23 of a facility 22 such as a store. An occupant of the autonomous vehicle 18 loaded into the vehicle entering chamber 3 can get off the autonomous vehicle 18 and walk to the entrance 23 on foot.

The vehicle exiting chamber 5 is connected to the outside of the parking assistance system 1 via an exit 27. The autonomous vehicle 18 can pass through the exit 27 from the vehicle exiting chamber 5 and proceeds to the outside of the parking assistance system 1. The vehicle exiting chamber 5 is adjacent to the entrance 23. The occupant can walk to the vehicle exiting chamber 5 from the entrance 23 on foot.

The parking area 7 is a place where multiple autonomous vehicles 18 can be parked. Multiple sections are provided in the parking area 7. Each section provided in the vehicle entering chamber 3, the vehicle exiting chamber 5, and the parking area 7 is a region in which one autonomous vehicle 18 can be parked. However, the parking area 7 does not need to be provided with the section.

The autonomous vehicle 18 can travel from the vehicle entering chamber 3 to the parking area 7. The autonomous vehicle 18 can travel from the parking area 7 to the vehicle exiting chamber 5.

Figure 2:
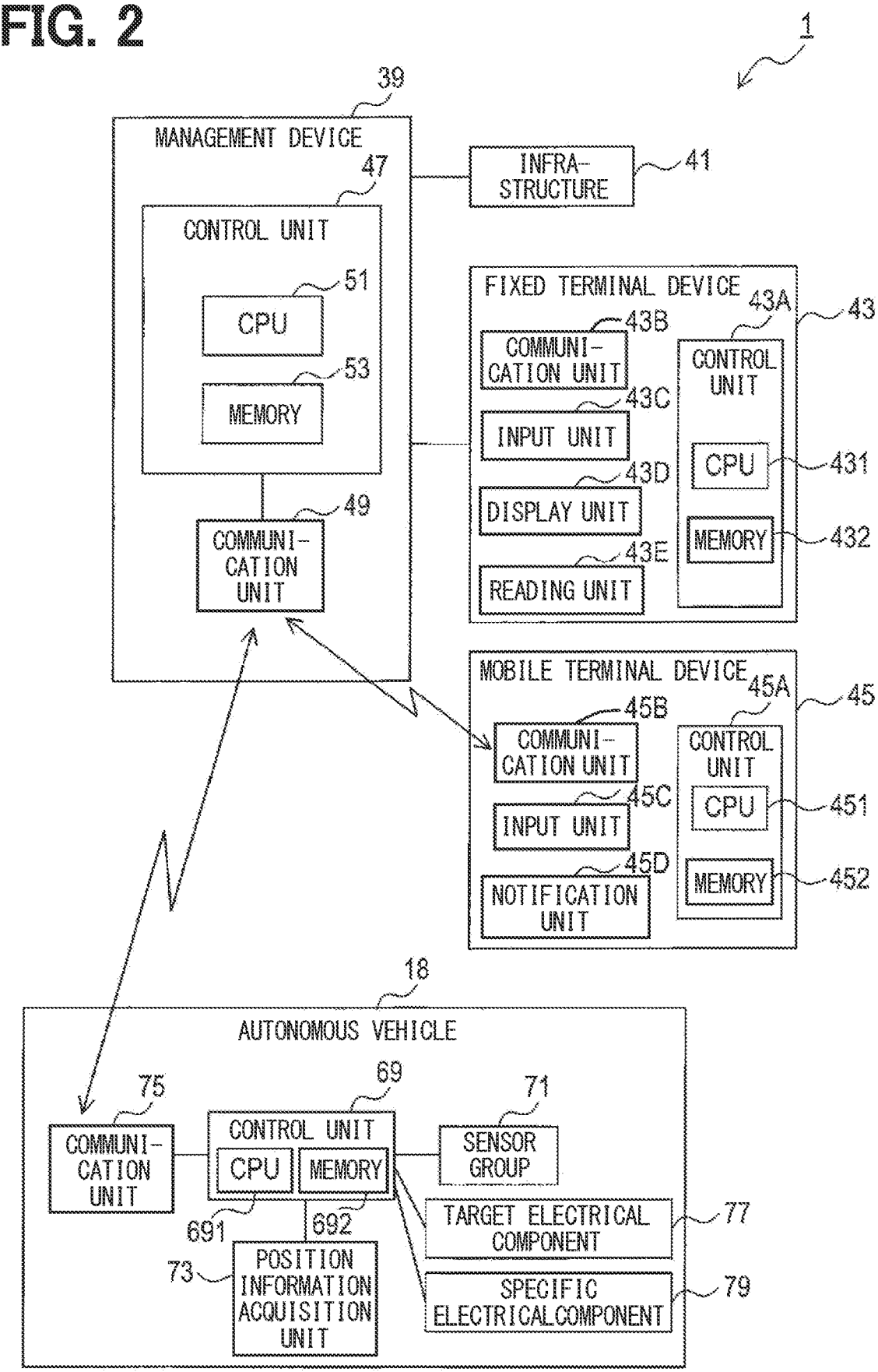
FIG. 2 is a block diagram showing a configuration of the parking assistance system.
Figure 3:
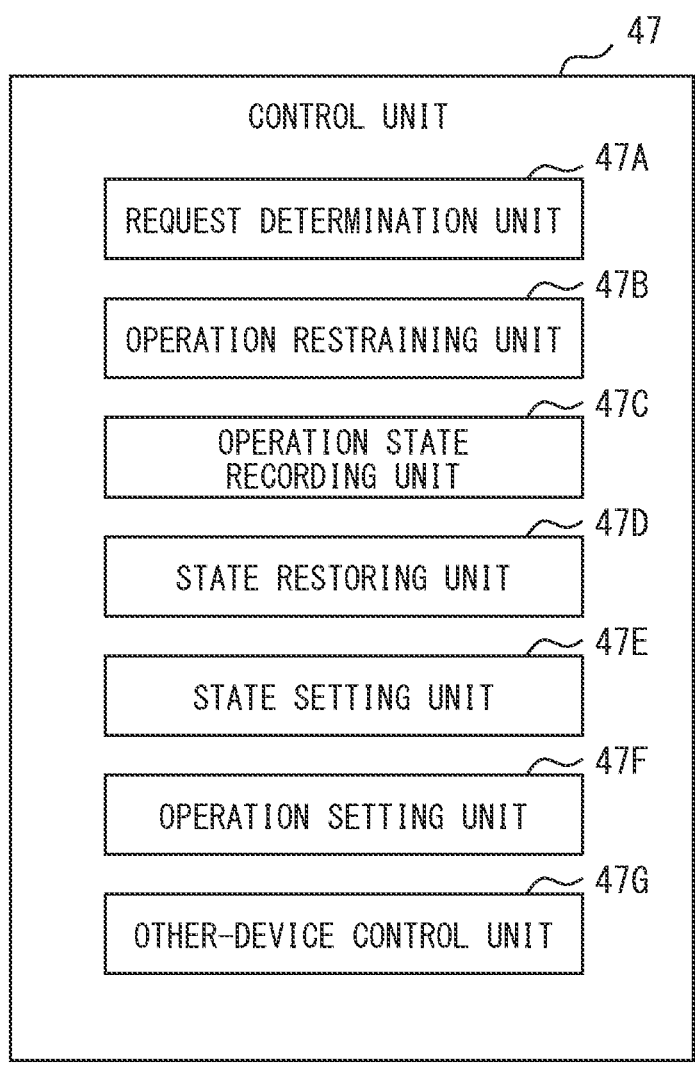
FIG. 3 is a block diagram showing a configuration of a control unit of a management device.

As shown in FIG. 2, the parking assistance system 1 includes the management device 39, an infrastructure 41, a fixed terminal device 43, and a mobile terminal device 45.

The management device 39 includes a control unit 47 and a communication unit 49. The control unit 47 includes a microcomputer including a CPU 51 and, for example, a semiconductor memory (hereinafter referred to as a memory 53) such as a RAM or a ROM.

Each function of the control unit 47 is implemented by executing a program stored in a non-transitory tangible storage medium by the CPU 51. In this example, the memory 53 corresponds to a non-transitory tangible storage medium in which the program is stored. A method corresponding to the program is performed by executing the program. The control unit 47 may include one microcomputer or multiple microcomputers.

The control unit 47 includes a configuration for transmitting the guide route to the parking position and a parking start instruction to the autonomous vehicle 18 and a configuration for controlling operation states of electrical components 77 and 79. The control unit 47 and the management device 39 having the control unit 47 mounted thereon correspond to the electrical component control device of the present disclosure. For example, as shown in FIG. 3, the control unit 47 includes a request determination unit 47A, an operation restraining unit 47B, an operation state recording unit 47C, a state restoring unit 47D, a state setting unit 47E, and an operation setting unit 47F, and an other-device control unit 47G. Operations of the respective units 47A to 47G constituting the control unit 47 will be described later.

The memory 53 stores map information of the parking lot. The map information includes information indicating a state of the section in the parking area 7. As the state of the section, there are an empty state (hereinafter referred to as an empty state) and a state occupied by the autonomous vehicle 18 (hereinafter referred to as an occupied state). The communication unit 49 can communicate with the autonomous vehicle 18.

The infrastructure 41 has a function of acquiring information (hereinafter referred to as in-parking lot information)

representing an internal situation of the parking assistance system 1 and supplying the in-parking lot information to the management device 39.

Examples of the in-parking lot information include information representing a position of an obstacle, information representing the state of a section in the parking area 7, and position information of the autonomous vehicle 18 existing in the parking assistance system 1.

The fixed terminal device 43 is installed in the vicinity of the vehicle entering chamber 3 as shown in FIG. 1. The fixed terminal device 43 includes a control unit 43A, a communication unit 43B, an input unit 43C, a display unit 43D, and a reading unit 43E. The vicinity of the vehicle entering chamber 3 represents a getting-off area, that is, the inside of the vehicle entering chamber 3 or its surroundings, and a range within which the user can quickly return to the vehicle entering chamber without making other users wait.

The control unit 43A receives an input operation by the occupant and outputs a signal in response to the input operation to the management device 39. The communication unit 43B can communicate with the management device 39. The input unit 43C receives the operation by the user. The display unit 43D is configured as a display. The reading unit 43E is configured as a scanner or the like.

The control unit 43A includes a microcomputer having a CPU 431 and a semiconductor memory such as RAM or ROM (hereinafter referred to as a memory 432). For example, the control unit 43A outputs a parking request signal in response to the input operation to the input unit 43C.

The parking request signal is a signal for requesting that the autonomous vehicle 18 is parked by moving the autonomous vehicle 18 in the vehicle entering chamber 3 to the parking area 7. When the signal in response to the input operation is output to the management device 39, the fixed terminal device 43 outputs identification information of the autonomous vehicle 18 and the like.

The mobile terminal device 45 includes a control unit 45A, a communication unit 45B, an input unit 45C, and a notification unit 45D. The control unit 45A includes a microcomputer having a CPU 451 and a semiconductor memory such as RAM or ROM (hereinafter referred to as memory 452).

The mobile terminal device 45 is a device possessed by the occupant of the autonomous vehicle 18, and is configured to communicate with the management device 39 using the communication unit 45B. The mobile terminal device 45 is configured as a smartphone, for example. The user can input instructions using the input unit 45C.

The notification unit 45D is configured as a display and a speaker, and notifies the occupant a command from the control unit 45A with an image or voice.

As described above, the autonomous vehicle 18 has an automatic valet parking function. As shown in FIG. 2, the autonomous vehicle 18 includes a control unit 69, a sensor group 71, a position information acquisition unit 73, a communication unit 75, a target electrical component 77, and a specific electrical component 79.

The control unit 69 includes a microcomputer including a CPU 691 and, for example, a semiconductor memory (hereinafter referred to as a memory 692) such as a RAM or a ROM. The control unit 69 controls each unit of the autonomous vehicle 18. The control unit 69 performs control to realize the function of autonomous driving. The autonomous vehicle 18 acquires the map information and the guide route of the parking lot from the management device 39, and uses the map information and the guide route of the parking lot when performing the autonomous driving.

The sensor group 71 acquires peripheral information representing a situation around the autonomous vehicle 18. An example of contents of the peripheral information includes a position of an obstacle existing around the autonomous vehicle 18. The sensor group 71 includes, for example, a camera, a lidar, and the like. The autonomous vehicle 18 uses the peripheral information when performing the autonomous driving.

The position information acquisition unit 73 acquires the position information of the autonomous vehicle 18. The position information acquisition unit 73 is, for example, a position estimation system using a lidar and a map. The autonomous vehicle 18 uses the position information when performing the autonomous driving. The communication unit 75 can communicate with the management device 39.

The target electrical component 77 is a preset device among the devices of the autonomous vehicle 18 that acts on the five senses of the user. The five senses of the user represent any of the user's senses of sight, hearing, touch, smell, and taste. Here, the target electrical component 77 includes at least one of a device that can be visually recognized by the user from inside the vehicle and an accessory device. Examples of the device that can be visually recognized by the user from inside the vehicle include a car navigation apparatus (hereinafter referred to as a car navigation system), an electrical component that presents information to the user, such as an instrument panel meter, an interior light, and a hazard flasher. The accessory device is a device for control turn-on/off of power by an accessory switch, and examples thereof include an audio and a cigarette lighter. The accessory devices are devices that are highly unlikely to be directly involved in traveling of the vehicle, and many of them are devices that act on the five senses of the user.

Alternatively, the target electrical component 77 may be a device capable of instructing turn-on/off control of the power by the control unit 69 of the autonomous vehicle 18.

The specific electrical component 79 is a predetermined device among the devices other than the target electrical component 77, and is an electrical component necessary for the autonomous driving function or an electrical component that contributes to user's comfort. Among the specific electrical components 79, electrical components necessary for the autonomous driving function include sonar, radar, headlights, and the like. Among the specific electrical components 79, electrical components that contribute to user's comfort include air conditioners, air cleaners, seat heaters, steering heaters, and the like. In the process to be described later, as an operation state of the air conditioner, a set temperature, a distinction of an inside air circulation and outside air circulation, and the like are controlled.

The functions that act on the five senses of the user may be restrained, even in the functions of electrical components that are necessary for the autonomous driving function. For example, a warning sound from a millimeter wave radar or an ultrasonic sensor may be restrained in an AVP mode, which will be described later.

[1-2. Process]

[1-2-1. Parking Setting Process Executed by Management Device 39]

Figure 4:
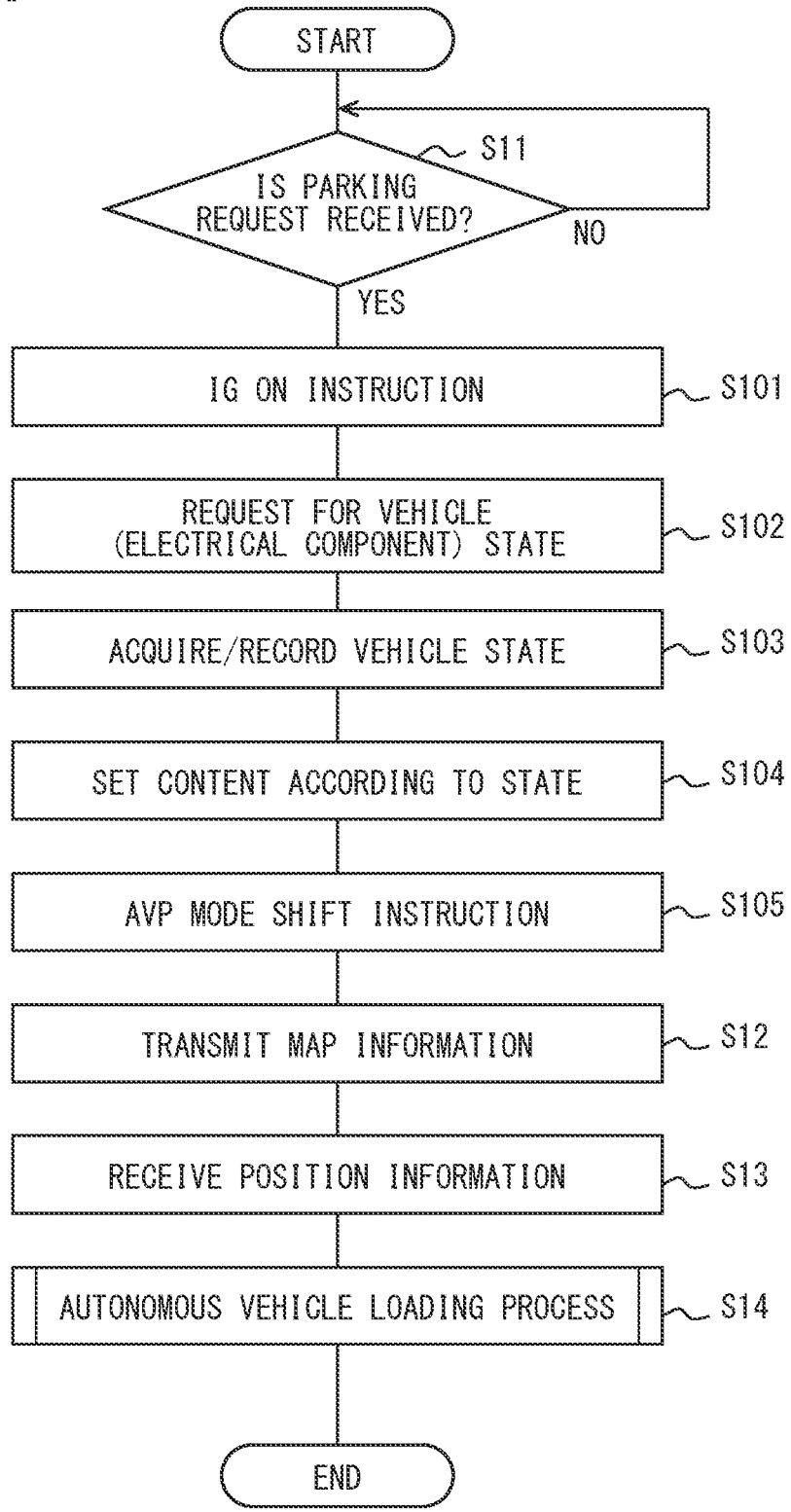
FIG. 4 is a flowchart of a parking setting process.

A parking setting process executed by the management device 39 will be described with reference to FIG. 4. The parking setting process is, for example, a process that is started when the power of the management device 39 is turned on and then repeatedly executed. Hereinafter, a process executed by the control unit 47 (particularly the CPU 51) of the management device 39 is also referred to as the process executed by the management device 39.

The request determination unit 47A of the management device 39 determines whether the parking request signal has been received in step (hereinafter referred to as "S") 11 of the parking setting process shown in FIG. 4. The parking request signal is one of movement requests to move the autonomous vehicle 18 in a state where on the user is not in the vehicle.

In this case, when a user such as an occupant of the autonomous vehicle 18 operates the fixed terminal device 43 to input a parking request, the fixed terminal device 43 transmits a parking request signal corresponding to this input to the management device 39. At this time, the user inputs vehicle information such as a number plate for specifying a vehicle, user information such as a user ID and a password for specifying the user, and other necessary types of information, to the fixed terminal device 43. After the operation of the parking request, the user can leave the parking lot and head for the destination.

In S11, when the request determination unit 47A determines that the parking request signal has not been received, S11 is repeated. When it is determined in S11 that the parking request signal has been received, the management device 39 transmits an IGON instruction for instructing to turn on the power of the vehicle, such as the ignition, to the autonomous vehicle 18 in S101.

Subsequently, in S102, the management device 39 requests the autonomous vehicle 18 to transmit a vehicle state. The vehicle state herein includes operation states of the target electrical component 77 and the specific electrical component 79 and a surrounding environment of the autonomous vehicle 18. The surrounding environment is information such as illuminance, temperature, and weather around the autonomous vehicle 18.

Subsequently, in S103, the operation state recording unit 47C of the management device 39 acquires the requested vehicle state from the autonomous vehicle 18 and records the vehicle state in the memory 53. That is, when attempting to restrain the operation, in detail, immediately before the vehicle moves from the vehicle entering chamber 3, the operation state recording unit 47C records the operation states of the target electrical component 77 and the specific electrical component 79 in the memory 53. The operation states of the target electrical component 77 and the specific electrical component 79 recorded in the memory 53 are a normal mode, which will be described later. For example, the operation state of each electrical component in the normal mode is the operation state of each electrical component immediately before the user turns off the ignition in the vehicle entering chamber 3.

The vehicle state includes operation states of individual target electrical components 77 and specific electrical components 79. In the operation state, for example, whether the power for each electrical component is turned off or on, and when the power is turned on, a lamp includes illuminance and color thereof, the air conditioner includes the set temperature, the air volume, the blowing port position, and the distinction of the inside air circulation air or outside air circulation, and the like.

Subsequently, in S104, the state setting unit 47E of the management device 39 sets the state of the target electrical component 77 at the time of shift to the AVP mode according to the vehicle state, setting by the user, and the surrounding environment. The AVP mode is a restraining mode of the present disclosure, and is a mode of restraining the operation state of the target electrical components 77 with the operation of the target electrical component 77, which is more than before the automatic valet parking is performed, when the automatic valet parking is performed. The setting of the operation state in the AVP mode is recorded in the memory 53 for each target electrical component 77. As a specific configuration for restraining the operation, for example, a configuration in which the management device 39 allows the target electrical component 77 to be in a waiting state, or a configuration in which the power of the target electrical component 77 is turned on when it can be restored to be turned on even if the power of the target electrical component 77 is turned off, can be adopted.

More specifically, in the AVP mode, multimedia devices, such as an air conditioner and an audio, are turned off. Drawing on the car navigation system or instrument panel is stopped, or an image or message is displayed indicating that the vehicle is automatically driven in the AVP mode.

In this case, for example, the state setting unit 47E is set to restrain an operation of the target electrical component 77 registered in advance as a device for restraining the operation during the AVP mode, such as turning off the power of the target electrical component 77, which is a lamp that assists a user's field of view. However, the state setting unit 47E changes the setting by the user, and a content set as the AVP mode when the setting needs to be changed according to the surrounding environment.

The other-device control unit 47G of the management device 39 sets a state of the specific electrical component 79 when shifting to the AVP mode. The other-device control unit 47G performs settings for controlling at least one of a setting for an air conditioner, a setting for inside air circulation, setting for outside air circulation, and an operation state of the accessory.

In this case, the user can set the operation states of the target electrical component 77 and the specific electrical component 79 input by the mobile terminal device 45. The setting made by the user should be mainly reflected at the time of exiting the vehicle, but may be reflected at the time of parking depending on a selection of the user. For example, the user can set the air conditioner to continue operating while the autonomous vehicle 18 is traveling in the AVP mode. When the setting is made by the user, contents set as the AVP mode is overwritten with a content set by the user.

The setting of the operation states of the target electrical component 77 and the specific electrical component 79 to be reflected during the exiting of the vehicle is referred to as a vehicle-exiting setting. In S103, the operation states of the target electrical component 77 and the specific electrical component 79 are recorded in the memory 53 as a normal mode. When the vehicle-exiting setting is set in S104, the normal mode recorded in S103 may be changed to the normal mode reflecting the setting for exiting the vehicle.

The setting for exiting the vehicle can be set any time before the operation states of the target electrical component 77 and the specific electrical component 79 are returned to the normal mode by the state restoring unit 47D of the management device 39. Hereinafter, an example in which the vehicle-exiting setting is performed after the user gets off the vehicle will be described.

Figure 8:
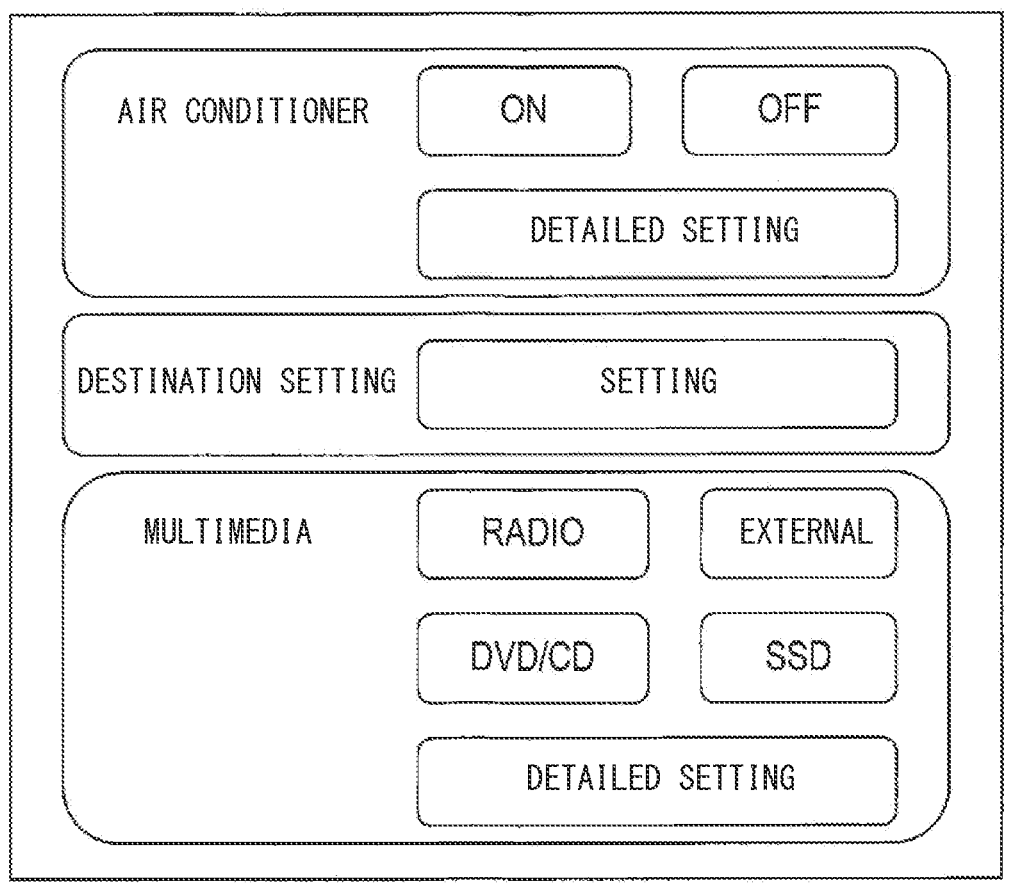
FIG. 8 is a display example of a vehicle-exiting setting by a fixed terminal device.

FIG. 8 is an example of a configuration of a screen of the vehicle-exiting setting, displayed on the display unit 43D of the fixed terminal device 43. The vehicle-exiting setting during the waiting time is made because it takes several minutes for the autonomous vehicle 18 to arrive at the vehicle exiting chamber 5 from a parking position. For example, after the user operates the fixed terminal device 43 to make a vehicle exiting request, the screen of FIG. 8 is displayed. The user can set whether the air conditioner is turned on, and further set a temperature and an air volume. The user can set a destination for a car navigation system, such as a home or facility, by operating the fixed terminal device 43. Further, the user can set an operation of multimedia and play a DVD concurrently with getting on the vehicle.

Figure 9:
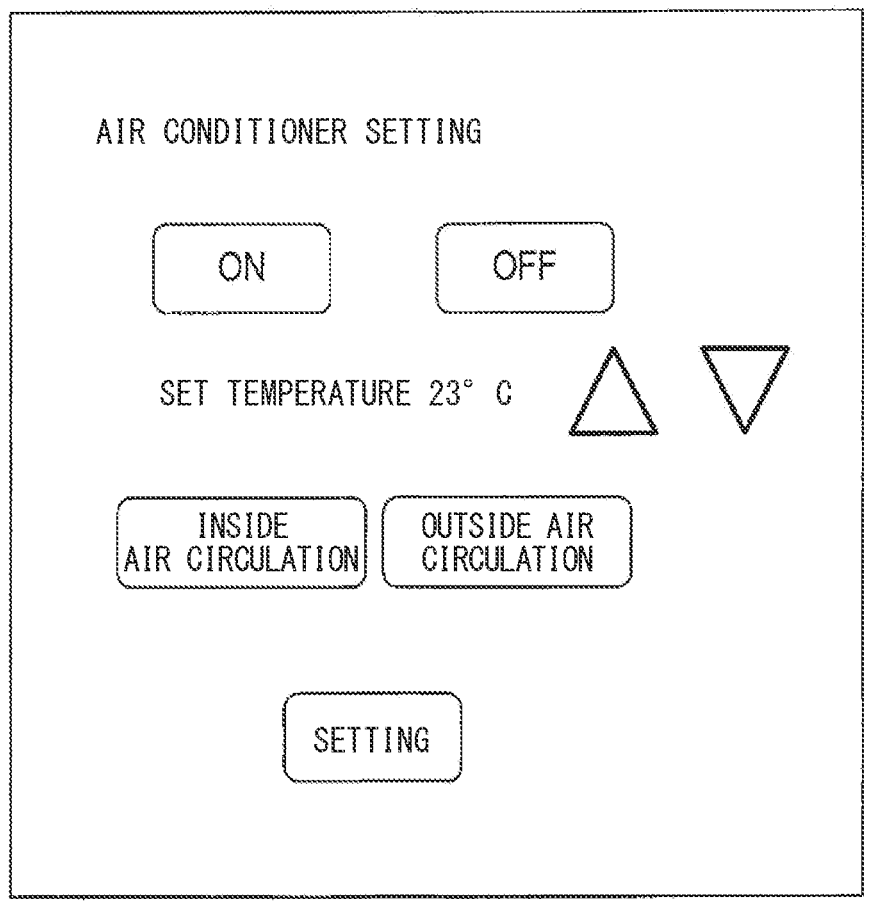
FIG. 9 is a display example of a vehicle-exiting setting by a mobile terminal device.

FIG. 9 is an example of a configuration of a screen for air conditioner setting displayed on the screen of the mobile terminal device 45 of the user. After the user gets out of the autonomous vehicle 18 and transmits a parking request signal to the management device 39 via the fixed terminal device 43 or the mobile terminal device 45, the operation state of the air conditioner at the time of exiting the vehicle can be set until the autonomous vehicle 18 arrives at the vehicle exiting chamber 5. For example, even when the user gets off the vehicle without operating the air conditioner during the entering of the vehicle, the mobile terminal device 45 can be operated to set the air conditioner to operate at the time of exiting the vehicle while shopping at the facility. The user can set operation states of a steering heater and a seat heater at the time of exiting the vehicle.

Since the operation states of the target electrical components 77 and the specific electrical components 79 in the normal mode are recorded in the memory 53 of the management device 39, the operation states of the target electrical component 77 and the specific electrical component 79 at the time of exiting the vehicle can be set even when ignition of the autonomous vehicle 18 is in an off-state.

The operation setting unit 47F sets the operation state of the target electrical component 77 according to the surrounding environment of the autonomous vehicle 18, in other words, an environment in the parking lot. For example, when the autonomous vehicle 18 has insufficient illuminance for autonomous driving, the headlight is turned on. Alternatively, when raindrops cause obscurity of an image of surroundings captured by a camera, a wiper is operated. In this manner, the operation setting unit 47F maintains a function necessary for traveling and stops a function necessary for the user's comfort, for example.

The surrounding environment of the autonomous vehicle 18 is acquired by, for example, an illuminance sensor or a raindrop sensor of the sensor group 71. Alternatively, the surrounding environment of the autonomous vehicle 18 is acquired by an illuminance sensor or a raindrop sensor of the infrastructure 41. The operation setting unit 47F issues an instruction to turn on the headlight to the autonomous vehicle 18 when the illuminance in the parking lot is below a reference value.

Subsequently, in S105, the management device 39 transmits an AVP mode shift instruction, which is an instruction to shift to the AVP mode, to the autonomous vehicle 18.

Subsequently, the management device 39 transmits the map information of the parking lot to the autonomous vehicle 18 in S12. That is, when an input indicating the start of parking is performed by the user with the fixed terminal device 43, the management device 39 transmits the map information of the parking lot to the autonomous vehicle 18.

The autonomous vehicle 18 that has received the map information is set to return position information as described later. Thus, the management device 39 receives the position information transmitted from the autonomous vehicle 18 in S13. Subsequently, the process proceeds to S14, and the management device 39 performs an autonomous vehicle entering process. The autonomous vehicle entering process is a process of moving the autonomous vehicle 18 to the parking position.

The autonomous vehicle entering process ends when the parking position is set, the guide route from a current location of the autonomous vehicle 18 to the parking position is set, the autonomous vehicle 18 is traveled according to the guide route, and a notification that the autonomous vehicle 18 arrived at the parking position has been parked is received.

When the autonomous vehicle entering process ends, the management device 39 ends the parking setting process.

[1-2-2. Automatic Parking Process Executed by Autonomous Vehicle 18]

Figure 5:
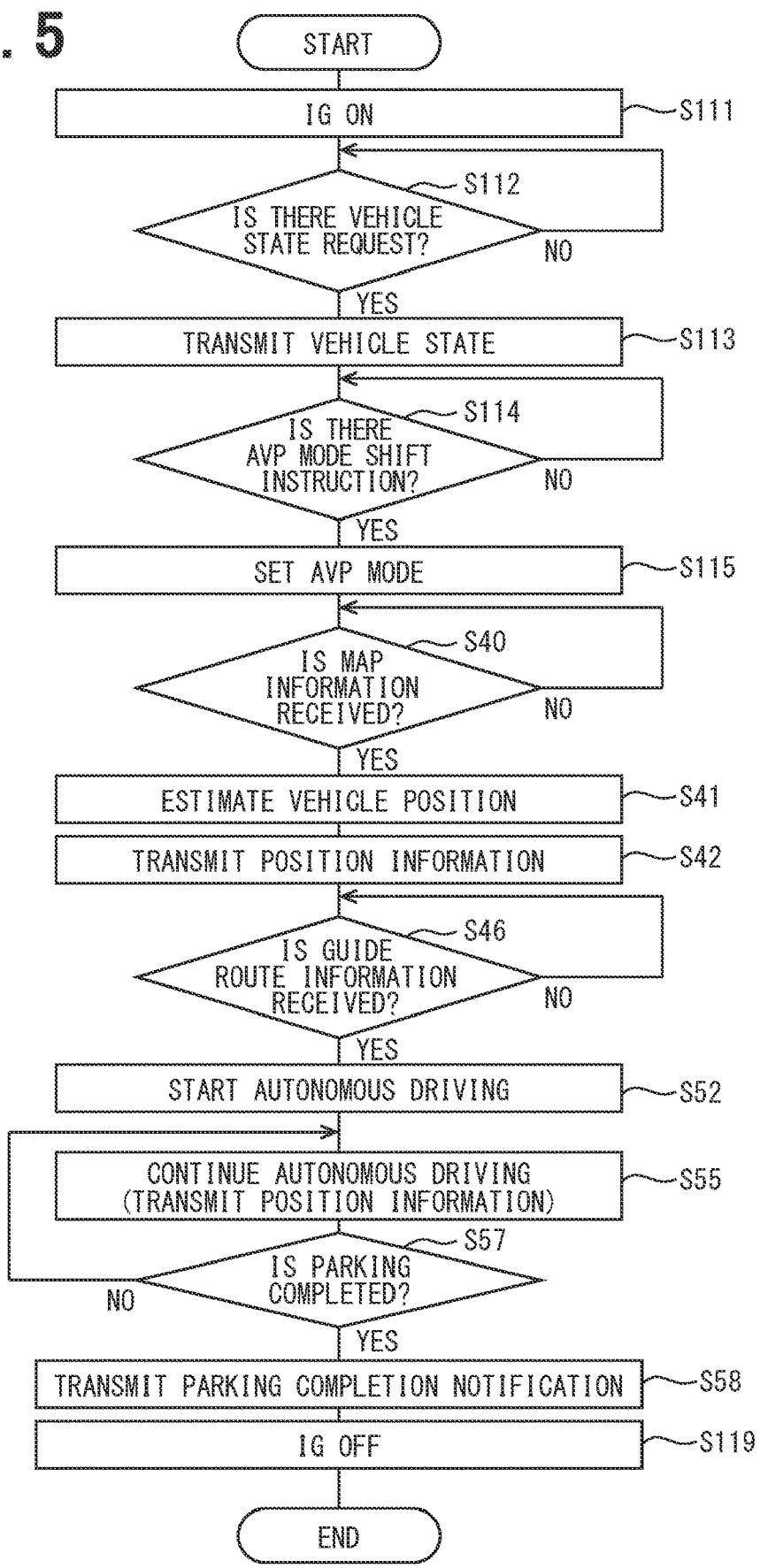
FIG. 5 is a flowchart of an automatic parking process.

The automatic parking process executed by the autonomous vehicle 18 will be described with reference to FIG. 5. The automatic parking process starts when an IGON instruction is received in the parking setting process executed by the management device 39. The automatic parking process is a process in which the autonomous vehicle 18 performs autonomous driving from the vehicle entering chamber 3 to the parking position. Hereinafter, a process executed by the control unit 69 of the autonomous vehicle 18 will also be referred to as a process executed by the autonomous vehicle 18.

In the automatic parking process, first, the power, such as ignition, of the autonomous vehicle 18 is turned on in S111. Subsequently, in S112, the autonomous vehicle 18 determines whether a vehicle state is requested from the management device 39.

The autonomous vehicle 18 returns to S112 when it is determined in S112 that no vehicle state is requested. On the other hand, when it is determined in S112 that the vehicle state is been requested, the autonomous vehicle 18 proceeds to S113, acquires the vehicle state, and transmits the vehicle state to the management device 39. That is, the autonomous vehicle 18 records the operation states of the target electrical component 77 and the specific electrical component 79 in the memory 53 of the management device 39 by transmitting the operation states of the target electrical component 77 and the specific electrical component 79 to the management device 39. The control unit 69 may record the vehicle state transmitted to the management device 39, here, the operation states of the target electrical component 77 and the specific electrical component 79 immediately before moving from the vehicle entering chamber 3, in the memory 692 of the autonomous vehicle 18.

Subsequently, in S114, the autonomous vehicle 18 determines whether there is the AVP mode shift instruction. When the autonomous vehicle 18 determines in S114 that there is no AVP mode shift instruction, the process returns to S114.

On the other hand, when the autonomous vehicle 18 determines in S114 that there is the AVP mode change instruction, the process proceeds to S115, and the autonomous vehicle 18 shifts from the normal mode to the AVP mode. In the AVP mode, the operation states of the electrical components 77 and 79 are changed to states set by the management device 39. That is, when the specific electrical component 79 that has not been operated before the change to the AVP mode is set to operate during the AVP mode in the process of S104, the specific electrical component 79 shifts to a state of operating the specific electrical component 79 in the process of S115. The process of S115 corresponds to a specific operation unit in the present disclosure.

Subsequently, the autonomous vehicle 18 determines whether the communication unit 75 has received the map information of the parking lot in S40. When the map information has not been received, the process returns to S40.

When the map information has been received, the process proceeds to S41, and the autonomous vehicle 18 estimates the current location of the autonomous vehicle 18. In S42, the autonomous vehicle 18 transmits the estimation result of the current location to the management device 39 as position information of the autonomous vehicle 18.

Subsequently, in S46, the autonomous vehicle 18 determines whether the guide route information has been received. The guide route information is transmitted by the management device 39. In S46, when the guide route information has not been received, the process returns to S46.

In S46, when the guide route information has been received, the autonomous vehicle 18 starts autonomous driving of the autonomous vehicle 18 in S52. When the autonomous vehicle 18 performs autonomous driving, the autonomous vehicle 18 travels in accordance with the guide route included in the guide route information.

Subsequently, the autonomous vehicle 18 continues the autonomous driving of the autonomous vehicle 18 in S55. In this case, the autonomous vehicle 18 repeatedly transmits the position information of the autonomous vehicle 18 to the management device 39 until it is determined in S57 that the parking has been completed, which will be described later. The transmitted position information is received by the management device 39.

Then, in 857, the autonomous vehicle 18 determines whether the parking has been completed. The completion of the parking means that the autonomous vehicle 18 has arrived at the parking position set in the management device 39. When the parking position is set to the target position, and the target position is then changed, the autonomous vehicle 18 determines that the parking has been completed even when the autonomous vehicle 18 arrives at a new target position after the change. When parking is not completed, the process returns to S55.

When parking has been completed, the process proceeds to S58, and the autonomous vehicle 18 transmits a parking completion notification by using the communication unit 75. Subsequently, in S119, the power of the autonomous vehicle 18, such as ignition, is turned off, and ends the process. The management device 39 receives the transmitted parking completion notification.

The infrastructure 41 may monitor the autonomous vehicle 18 that has completed parking and is parked in the parking area 7. The management device 39 may receive information from the infrastructure 41, and determine an abnormal vehicle when the autonomous vehicle 18 is detected while tuning on an interior light to notify the abnormal vehicle of an operator of the parking lot.

[1-2-3. Vehicle Unentering Setting Process Executed by Management Device 39]

Figure 6:
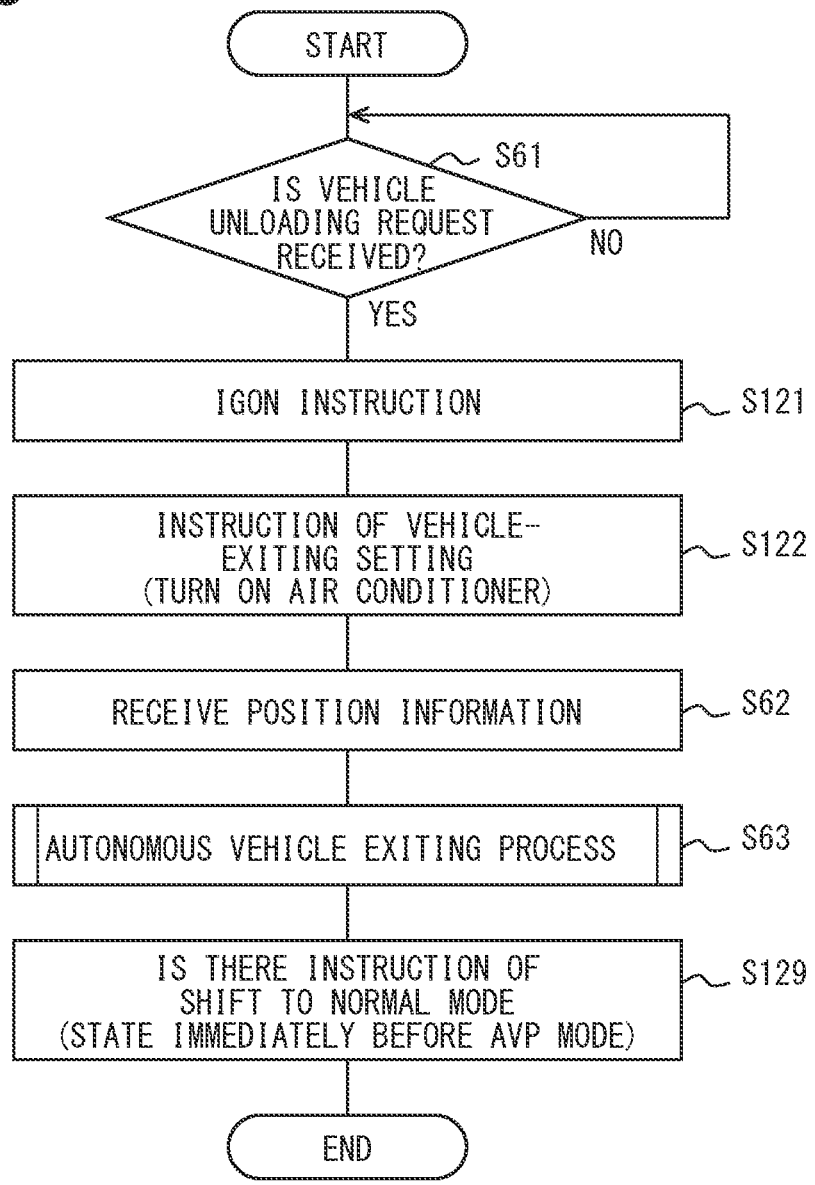
FIG. 6 is a flowchart of a vehicle exiting setting process.

A vehicle exiting setting process executed by the management device 39 will be described with reference to FIG. 6. The vehicle exiting setting process is a process of moving the autonomous vehicle 18 from the parking position to the vehicle exiting chamber 5 by self-traveling of the autonomous vehicle 18.

The vehicle exiting setting process is a process repeatedly executed by the management device 39, for example, in parallel with other processes. For example, when multiple autonomous vehicles 18 exist in the parking lot, the vehicle exiting setting process for one of the autonomous vehicles 18 is performed in parallel with a vehicle exiting setting process for the other autonomous vehicle 18 or the parking setting process, the vehicle entering process, and the vehicle exiting process. In the vehicle exiting setting process, first, the management device 39 determines whether a vehicle exiting request signal has been received in S61. The fixed terminal device 43 transmits the vehicle exiting request signal, for example.

When there is no vehicle exiting request signal in S61, the process repeats S61. When there is the vehicle exiting request signal in S61, the management device 39 transmits the IGON instruction to the autonomous vehicle 18 in S121. This process is the same as S101 described above. Subsequently, in S122, the management device 39 instructs the autonomous vehicle 18 to set for exiting the vehicle. The setting for exiting the vehicle is the setting at the time of exiting of the vehicle from among the settings according to input by the user using the mobile terminal device 45 in S104. For example, when the air conditioner is turned off when the user gets off the vehicle, but when the user desires that the air conditioner is turned on when the user gets on the vehicle, the user can set the air conditioner to be turned on in advance by using the mobile terminal device 45. The vehicle-exiting setting is transmitted to the autonomous vehicle 18 before the autonomous vehicle 18 starts moving for exiting the vehicle, an internal space of the autonomous vehicle 18 can be made comfortable until the autonomous vehicle 18 arrives at the vehicle exiting chamber 5.

Subsequently, the management device 39 receives the position information transmitted from the autonomous vehicle 18 in S62. Subsequently, the management device 39 performs an autonomous vehicle exiting process in S63. The autonomous vehicle exiting process is a process of moving the autonomous vehicle 18 to the vehicle exiting chamber 5.

The autonomous vehicle exiting process ends when a vehicle exiting position is set in the vehicle exiting chamber 5, the guide route from a current location of the autonomous vehicle 18 to the vehicle exiting position is set, the autonomous vehicle 18 is traveled according to the guide route, and a notification that the autonomous vehicle 18 arrived at the vehicle exiting position has been unloaded is received.

When the autonomous vehicle exiting process ends, in S129, the state restoring unit 47D of the management device 39 restores the operation states of the target electrical components 77 and the specific electrical components 79 to the normal mode, that is, the state before the shift to the AVP mode. That is, when the operation of the target electrical component 77 is restrained, the state restoring unit 47D restores the operation state of the target electrical component 77 to the operation state of the target electrical component 77 recorded in the memory 53 before the user gets on the autonomous vehicle 18. However, when the user inputs the setting such as the vehicle-exiting setting, the setting made by the user is given priority.

When the process ends, the management device 39 ends the process.

[1-2-4. Automatic Vehicle Unentering Process Executed by Autonomous Vehicle 18]

An automatic vehicle exiting process executed by the autonomous vehicle 18 will be described with reference to FIG. 7. The automatic vehicle exiting process starts when the IGON instruction is received in the vehicle exiting setting process executed by the management device 39. The automatic vehicle exiting process is a process of causing the autonomous vehicle 18 to travel from the parking position to the vehicle exiting chamber 5 in accordance with the vehicle exiting setting process executed by the management device 39.

Figure 7:
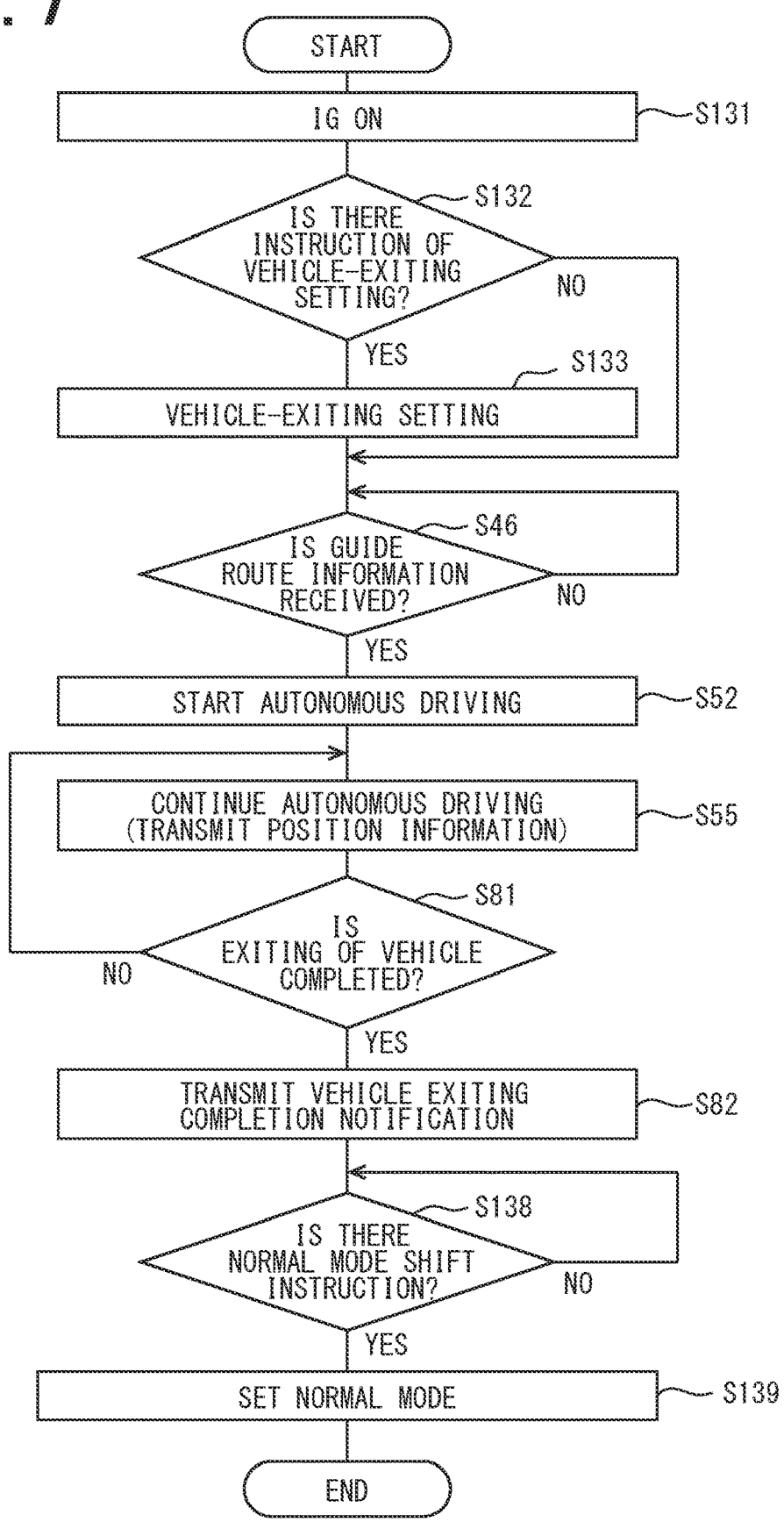
FIG. 7 is a flowchart of an automatic vehicle exiting process.

In the automatic vehicle exiting process, as shown in FIG. 7, the power of the autonomous vehicle 18, such as the ignition, is first turned on in S131. Subsequently, in S132, the autonomous vehicle 18 determines whether there is an instruction of a vehicle-exiting setting.

When the autonomous vehicle 18 determines in S132 that there is no instruction of the vehicle-exiting setting, the process proceeds to S46. On the other hand, when the autonomous vehicle 18 determines in S132 that there is an instruction of the vehicle-exiting setting, the process proceeds to S133 to reflect the setting for exiting the vehicle. When the vehicle-exiting setting is reflected, the operation states of the target electrical component 77 and the specific electrical component 79 specified by the vehicle-exiting setting are changed, and the other electrical component remains in the AVP mode.

Subsequently, the processes of S46, S52, and S55 of the automatic parking process described above are performed. After S55, the autonomous vehicle 18 determines whether the exiting of the vehicle is completed in S81. When it is detected that the autonomous vehicle 18 has arrived at the vehicle exiting chamber 5, which is the target position, the autonomous vehicle 18 determines that the exiting has been completed.

When the exiting is not completed, the process returns to S55. When the exiting has been completed, in S82, the autonomous vehicle 18 transmits the exiting completion notification to the management device 39.

Subsequently, in S138, the autonomous vehicle 18 determines whether the normal mode shift instruction has been received. When the autonomous vehicle 18 determines in S138 that the normal mode shift instruction has not been received, the process returns to S138.

On the other hand, when the autonomous vehicle 18 determines in S138 that the normal mode shift instruction has been received, the process proceeds to S139, and the autonomous vehicle 18 shifts from the AVP mode to the normal mode. The autonomous vehicle 18 shifts the operation states of the target electrical component 77 and the specific electrical component 79 to the normal mode according to the instruction from the management device 39. However, when the operation states of the target electrical component 77 and the specific electrical component 79 before changed to the AVP mode are recorded in the memory 692 of the autonomous vehicle 18, the autonomous vehicle 18 may be restored to the operation state at any time when the process of S139 is performed.

[1-3. Advantageous Effects]

According to the embodiment described in detail above, the following effects are obtained.

(1a) One aspect of the present disclosure is a management device 39 configured to control the operation state of at least one electrical component mounted in an autonomous vehicle 18. The management device 39 includes a request determination unit 47A and an operation restraining unit 47B.

The request determination unit 47A determines whether a movement request for moving the autonomous vehicle 18 in a state where the user is not in the vehicle is received. The operation restraining unit 47B restrains the operation of the target electrical component 77 representing an electrical component that acts on five senses of the user when the autonomous vehicle 18 is instructed to move in response to a request.

According to such a configuration, since an operation of the target electrical component 77 is restrained when the autonomous vehicle 18 travels without picking up the user, it is possible to reduce a use of unnecessary energy when the autonomous vehicle 18 moves.

(1b) One aspect of the present disclosure further includes an operation state recording unit 47C and a state restoring unit 47D. The operation state recording unit 47C records the operation state of the target electrical component 77 in the memory 53 when the operation restraining unit 47B attempts to restrain the operation of the target electrical component 77. When the operation restraining unit 47B restrains the operation of the target electrical component 77, the state restoring unit 47D restores the operation state of the target electrical component 77 to the operation state of the target electrical component 77 recorded in the memory 53 before the user gets on the autonomous vehicle 18.

According to such a configuration, even if the management device 39 restrains the operation of the target electrical component 77, when the user gets on the vehicle, the management device 39 restores the operation state immediately before the restraining of the operation, such that the user can get on the vehicle without any sense of incompatibility.

(1c) In one aspect of the present disclosure, the operation state recording unit 47C records whether the power of the target electrical component 77 is turned on or off as the operation state of the target electrical component 77, and records at least one of illuminance and color of a lamp when the power of the target electrical component 77 is turned on and the target electrical component 77 includes the lamp.

According to such a configuration, it is possible to record whether the power of the target electrical component 77 is turned on in the memory 53. When the power of the target electrical component 77 is turned on and the target electrical component 77 includes the lamp, the management device 39 can record at least one of the illuminance and color of the lamp in the memory 53. Therefore, since the management device 39 records the operation state in more detail, even if the operation of the target electrical component 77 is restrained, the operation state can be more faithfully reproduced and restored.

(1d) In one aspect of the present disclosure, the operation state recording unit 47C is configured to record whether the power of the target electrical component 77 turned on or off as the operation state of the target electrical component 77, and when the power of the target electrical component 77 is turned on and the target electrical component 77 includes an air conditioner, at least one of a set temperature, an air volume, a blowing port position, and a distinction of an inside air circulation or outside air circulation of the air conditioner is recorded.

According to such a configuration, it is possible to record whether the power of the target electrical component 77 is turned on in the memory 53. When the power of the target electrical component 77 is turned on and the target electrical component 77 includes the air conditioner, the management device 39 can record at least one of the set temperature, the air volume, the blowing port position, and the distinction of the inside air circulation or outside air circulation of the air conditioner. Therefore, since the management device 39 records the operation state in more detail, even if the operation of the target electrical component 77 is restrained, the operation state can be more faithfully reproduced and restored.

(1e) In one aspect of the present disclosure, a state setting unit 47E is further provided. The state setting unit 47E sets the operation state of the target electrical component 77 according to a content set by the user and input from the mobile terminal device 45 communicably connected to the management device 39. The state restoring unit 47D shifts the operation state of the target electrical component 77 to the operation state set by the state setting unit 47E.

According to such a configuration, when the user gets on the autonomous vehicle 18, the operation state of the target electrical component 77 can be set to the operation state set by the user.

(1f) In one aspect of the present disclosure, the corresponding management device 39 is mounted in the management device 39 that transmits an instruction to the autonomous vehicle 18 to perform automatic valet parking in which the autonomous vehicle 18 moves between the getting on-off area and the parking area in the parking lot. The request determination unit 47A determines whether a request for performing the automatic valet parking in a state where the user is not in the vehicle, as a movement request is received.

When the automatic valet parking is performed, the operation restraining unit 47B switches the operation state of the target electrical component 77 to a restraining mode in which the operation of the target electrical component 77 is restrained more than before the automatic valet parking is performed. The operation state recording unit 47C records the operation state of the target electrical components 77 mounted in the autonomous vehicle 18 that performs the automatic valet parking from the getting on-off areas 3 and 5 to the parking area 7 in the parking lot.

According to such a configuration, when the management device 39 has a function of transmitting an instruction in automatic valet parking, the operation state of the target electrical component 77 can be controlled well in conjunction with the automatic valet parking function.

(1g) In one aspect of the present disclosure, the request determination unit 47A determines whether the request for performing the automatic valet parking, in which the autonomous vehicle 18 moves between the getting on-off areas 3 and 5 and the parking area 7 in the parking lot in a state where the user is not in the vehicle, is received as the movement request. When the automatic valet parking is performed, the operation restraining unit 47B switches the operation state of the target electrical component 77 to a restraining mode in which the operation of the target electrical component 77 is restrained more than before the automatic valet parking is performed.

According to such a configuration, when the automatic valet parking is performed, since the operation mode of the target electrical component 77 is switched by switching the operation mode, the operation can be restrained with a simple process even if there are multiple target electrical components 77.

(1h) In one aspect of the present disclosure, an operation setting unit 47F is further provided. The operation setting unit 47F sets the operation state of the target electrical component 77 according to an environment in the parking lot.

According to such a configuration, it is possible to set the operation state of the target electrical component 77 when the automatic valet parking is performed according to the parking lot environment.

(1i) In one aspect of the present disclosure, when receiving a request for starting the automatic valet parking, the control unit 69 of the autonomous vehicle 18 switches the operation state of the target electrical component 77 to the AVP mode.

According to such a configuration, when the automatic valet parking is performed according to an instruction from an external device such as the management device 39, it is possible to immediately shift to the AVP mode.

(1j) In one aspect of the present disclosure, the target electrical component 77 includes at least one of a device visually recognized by the user in the vehicle and an accessory device.

According to such a configuration, since there is a high possibility that the device visually recognized by the user in the vehicle and the accessory device do not need to be operated when the user is not in the vehicle, it is possible to efficiently reduce consumption energy when the autonomous vehicle 18 is operated unmanned.

(1k) One aspect of the present disclosure further includes an other-device control unit 47G. The other-device control unit 47G controls at least one of a setting of the air conditioner, a setting of inside air circulation and outside air circulation, and an operation state of the accessories, together with the target electrical component 77.

According to such a configuration, it is possible to control at least one of other devices, that is, the setting of the air conditioner, the setting of inside air circulation and outside air circulation, and the operation state of an accessory, together with the target electrical component 77.

2. Other Embodiments

Although the embodiments of the present disclosure have been described above, the present disclosure is not limited to the above-described embodiments, and can be realized in various modifications.

(2a) In the embodiment, the management device 39 has the a function of controlling the operation state of the target electrical component 77, but the present invention is not limited thereto. For example, the autonomous vehicle 18 may have this function. In this case, when the power of the vehicle is turned on in response to the instruction from the management device 39 or the like, and when the autonomous driving such as automatic valet parking is performed in a state where any person such as a user is not in the vehicle, the control unit 69 of the autonomous vehicle 18 may be configured to immediately shift to the AVP mode.

According to such a configuration, when the power of the autonomous vehicle 18 is turned on in response to an instruction from an external device such as the management device 39, the operation state of the target electrical component 77 can shift to the AVP mode without receiving a separate instruction to shift to the AVP mode.

(2b) The control unit 69 of the autonomous vehicle 18 may set such that a predetermined specific electrical component 79 other than the target electrical component 77 operates when shifting to the AVP mode.

According to such a configuration, it is possible to operate the specific electrical components 79 such as the electrical components necessary for the autonomous driving function without depending on the instruction from an external device such as the management device 39.

(2c) The configuration of the present disclosure is applicable to other than the autonomous vehicle 18 in automatic valet parking. For example, in an autonomous vehicle, such as an autonomous taxi and an autonomous truck, which is traveled in response to a command from an external device such as the management device 39 or the like, the autonomous vehicle may be switched between the AVP mode and the normal mode depending on the presence or absence of passengers.

(2d) The control unit 47 of the management device 39, the control unit 69 of the autonomous vehicle 18, and methods thereof described in the present disclosure can be implemented by a dedicated computer, which is configured with a memory and a processor programmed to execute one or more functions embodied in computer programs. Alternatively, the control unit 47 of the management device 39, the control unit 69 of the autonomous vehicle 18, and the methods thereof described in the present disclosure may be implemented by a dedicated computer configured with a processor having one or more dedicated hardware logic circuits. Alternatively, the control unit 47 of the management device 39, the control unit 69 of the autonomous vehicle 18, and the methods thereof described in the present disclosure may be implemented by one or more dedicated computer, which is configured with a combination of a processor and a memory, which are programmed to perform one or more functions, and a processor which is configured with one or more hardware logic circuits. The computer programs may be stored, as instructions to be executed by a computer, in a tangible non-transitory computer-readable recording medium. In the methods for implementing functions of each unit of the control unit 47 of the management device 39 and the control unit 69 of the autonomous vehicle 18, it does not necessarily include software, and the entire function thereof may be implemented using one or more pieces of hardware.

(2e) Multiple functions of one constituent element in the embodiment may be implemented by multiple constituent elements, or a function of one constituent element may be implemented by multiple constituent elements. Multiple functions of the plurality of constituent elements may be implemented by one constituent element, and one function implemented by multiple constituent elements may be implemented by one constituent element. A part of the configuration of the embodiment may be omitted. At least a part of the configuration of the embodiment may be added to or substituted for the configuration of the other embodiment.

(2f) In addition to the parking assistance system 1 described above, the present disclosure can be implemented in various forms, such as each device that is a constituent element of the parking assistance system 1, a program for causing a computer to function as a device that constitutes the parking assistance system 1, and a non-transitory tangible storage medium such as a semiconductor memory in which the program is recorded, a parking assistance method, and an electrical component control method.

The invention claimed is:

1. An electrical component control device that controls an operation of at least one electrical component mounted in an autonomous vehicle, the electrical component control device comprising:
   a request determination unit configured to determine whether a movement request for moving the autonomous vehicle without a user in the autonomous vehicle is received;
   an operation restraining unit configured to restrain operations of a plurality of target electrical components that act on five senses of the user when the autonomous vehicle is instructed to move in response to the movement request;
   an operation state recording unit configured to record, in a memory, operation states of the target electrical components at a timing the operation restraining unit restrains the operations of the target electrical components; and
   a state restoring unit configured to, after the operation restraining unit restrained the operations of the target electrical components, restore the target electrical components to the operation states recorded in the memory before the user gets on the autonomous vehicle.

2. The electrical component control device according to claim 1, wherein
   the operation state recording unit is configured to:
      record whether the target electrical components are turned on or off as the operation states of the target electrical components; and
      record at least one of illuminance and color of a lamp when the target electrical components are turned on and the target electrical components include the lamp.

3. The electrical component control device according to claim 1, wherein
   the operation state recording unit is configured to:
      record whether the target electrical components are turned on or off as the operation states of the target electrical components; and
      record at least one of a set temperature, an air volume, a blowing port position, and an inside air circulation mode or an outside air circulation mode of an air conditioner when the target electrical components are turned on and the target electrical components include the air conditioner.

4. The electrical component control device according to claim 1, further comprising:
   a state setting unit configured to set the operation states of the target electrical components according to an instruction input by the user via a mobile terminal device communicably connected to the electrical component control device, wherein
   the state restoring unit is configured to shift the target electrical components to the operation state set by the state setting unit.

5. The electrical component control device according to claim 1, wherein
   the electrical component control device is mounted in a management device that is configured to transmit an instruction to the autonomous vehicle to perform automatic valet parking to move between a getting on-off area and a parking area in a parking lot,
   the request determination unit is configured to determine whether a request for performing the automatic valet parking without the user in the autonomous vehicle is received as the movement request,
   the operation restraining unit is configured to, when the automatic valet parking is performed, switch the operation states of the target electrical components to a restraining mode in which the operations of the target electrical components are restrained in a more restrictive manner than before the automatic valet parking is performed, and
   the operation state recording unit is configured to record the operation states of the target electrical components mounted in the autonomous vehicle that performs the automatic valet parking from the getting on-off area to the parking area in the parking lot.

6. The electrical component control device according to claim 5, further comprising:
   an operation setting unit configured to set the operation states of the target electrical components according to an environment in the parking lot.

7. The electrical component control device according to claim 5, wherein
   the electrical component control device is mounted in the autonomous vehicle, and the electrical component control device further comprises:
a specific operation unit configured to, when the automatic valet parking is performed, operate a predetermined specific electrical component other than the target electrical components.

8. The electrical component control device according to claim 5, wherein
the electrical component control device is mounted in the autonomous vehicle that performs the automatic valet parking in response to a start command from an outside, and
the operation restraining unit is configured to switch the operation states of the target electrical components to the restraining mode upon receiving the start command.

9. The electrical component control device according to claim 1, wherein
the request determination unit is configured to determine whether a request for the autonomous vehicle to perform an automatic valet parking to move between a getting on-off area and a parking area in a parking lot without the user in the autonomous vehicle is received as the movement request, and
the operation restraining unit is configured to, when the automatic valet parking is performed, switch operation states of the target electrical components to a restraining mode in which the operations of the target electrical components are restrained in a more restrictive manner than before the automatic valet parking is performed.

10. The electrical component control device according to claim 1, wherein
the target electrical components include at least one of a device visually recognized by the user in the autonomous vehicle and an accessory device.

11. The electrical component control device according to claim 1, further comprising:
an other-device control unit configured to control, in addition to the target electrical components, at least one of a setting of air conditioner, a setting of inside air circulation mode or outside air circulation mode, and an operation state of an accessory.

12. An in-vehicle electrical component control device that controls an operation state of at least one electrical component mounted in an autonomous vehicle, the in-vehicle electrical component control device comprising:
an operation restraining unit configured to restrain operations of a plurality of target electrical components that act on five senses of a user when the autonomous vehicle is instructed to move in response to a movement request for the autonomous vehicle to perform automatic valet parking to move between a getting on-off area and a parking area in a parking lot without the user in the autonomous vehicle;
an operation state recording unit configured to record, in a memory, operation states of the target electrical components at a timing the operation restraining unit restrains the operations of the target electrical components; and
a state restoring unit configured to, after the operation restraining unit restrained the operations of the target electrical components, restore the target electrical components to the operation states recorded in the memory before the user gets on the autonomous vehicle, wherein
the operation restraining unit is configured to, when the automatic valet parking is performed, switch the target electrical components to a restraining mode in which the operations of the target electrical components are restrained in a more restrictive manner than before the automatic valet parking is performed.

13. An electrical component control device that controls an operation of at least one electrical component mounted in an autonomous vehicle, the electrical component control device comprising:
at least one processor programmed to:
determine whether a movement request for moving the autonomous vehicle without a user in the autonomous vehicle is received;
restrain operations of a plurality of target electrical components that act on five senses of the user when the autonomous vehicle is instructed to move in response to the movement request;
record, in a memory, operation states of the target electrical components at a timing of restraining the operations of the target electrical components; and
after restraining the operations of the target electrical components, restore the target electrical components to the operation states recorded in the memory before the user gets on the autonomous vehicle.

* * * * *